United States Patent [19]

Sharma

[11] Patent Number: 5,314,526
[45] Date of Patent: May 24, 1994

[54] METALLOTHERMIC REDUCTION OF RARE EARTH FLUORIDES

[75] Inventor: Ram A. Sharma, Troy, Mich.

[73] Assignee: General Motors Corporation, Detroit, Mich.

[21] Appl. No.: 623,150

[22] Filed: Dec. 6, 1990

[51] Int. Cl.⁵ .................................................. C22B 5/00
[52] U.S. Cl. ..................................... 75/610; 420/416; 423/21.5
[58] Field of Search .................... 75/610; 420/416; 423/21.5

[56] References Cited

U.S. PATENT DOCUMENTS

| | | | |
|---|---|---|---|
| 2,950,962 | 8/1960 | Carlson et al. | 75/84.4 |
| 3,925,062 | 12/1975 | Trombe et al. | 75/84 |
| 4,578,242 | 3/1986 | Sharma | 420/590 |
| 4,636,353 | 1/1987 | Seon et al. | 420/416 |
| 4,680,055 | 7/1987 | Sharma | 75/84.5 |
| 4,767,455 | 8/1988 | Jourdan | 75/84.4 |
| 4,786,319 | 11/1988 | Zeiringer | 75/10.62 |
| 4,992,096 | 2/1991 | Skach, Jr. et al. | 75/610 X |

FOREIGN PATENT DOCUMENTS 0254251 1/1988 European Pat. Off. .
284889 6/1915 Fed. Rep. of Germany .

Primary Examiner—Donald P. Walsh
Assistant Examiner—David Jenkins
Attorney, Agent, or Firm—George A. Grove

[57] ABSTRACT

A process is disclosed for the calcium reduction of rare earth fluorides, especially neodymium and/or praseodymium fluorides, in a minimum volume stirred molten calcium chloride reaction medium that produces high yield, high quality rare earth alloy with a calcium fluoride byproduct that can be recycled to generate more rare earth fluoride starting material.

8 Claims, 2 Drawing Sheets

METALLOTHERMIC REDUCTION OF RARE EARTH FLUORIDES

This invention relates to a reactor volume efficient, high yield process for producing high quality rare earth metals, especially neodymium and/or praseodymium, from rare earth fluorides. More specifically, this invention relates to such a reduction reaction practice utilizing a calcium chloride reaction medium bath and calcium metal as the reductant.

BACKGROUND

There is a general need for more efficient practices for the chemical reduction of rare earth element compounds to the respective rare earth metals. This need is especially prevalent with respect to the rare earth elements neodymium and praseodymium because of their increased utilization in iron-neodymium (and/or praseodymium)-boron type permanent magnets. As the many different types and forms of these magnets compete for applications, it is desirable to produce the rare earth constituent(s), neodymium and/or praseodymium, at lower cost.

My earlier patents describe the metallothermic reduction of rare earth oxides dispersed in a molten salt reaction medium (typically comprising calcium chloride) using elemental calcium as the reductant (U.S. Pat. No. 4,578,242) and the reduction of rare earth chlorides in the same type of reaction medium (U.S. Pat. No. 4,680,055). The metallothermic reduction of rare earth oxides such as neodymium (and/or praseodymium) oxide has been used commercially to produce neodymium metal for the types of permanent magnets described above. The use of the molten salt reaction medium in combination with a molten neodymium-iron alloy product recovery phase produces high purity neodymium metal in good yield, about 95 percent yield. However, a mixture of byproduct calcium oxide and calcium chloride is formed, which requires a disposal decision. Furthermore, the required volume of calcium chloride reaction medium with respect to the yield of neodymium metal is fairly high, which reduces the capacity and the efficiency of the reactor. Similar drawbacks are associated with the use of neodymium chloride as a starting material. Furthermore, the use of neodymium chloride requires that the most readily available form of this material must be dried and made anhydrous before it can be used in the very hot molten salt bath.

Other workers, Seon et al, U.S. Pat. No. 4,636,353, have described a reduction process for rare earth fluorides like neodymium fluoride that utilizes a mixture of calcium chloride, calcium and iron. These materials are simply mixed together in finely divided particle form and heated without stirring to a high temperature, preferably 900° C. to 1100° C. A reaction product mass is formed that comprises a calcium chloride-calcium fluoride slag, residual calcium and a mixture of iron and neodymium. The yield in this practice is relatively low, the reaction temperatures are high, and separation of the slag from the metallic product is not easy and convenient.

It is an object of this invention to provide an improved method for producing rare earth metals from their corresponding fluorides in high yield and high quality. It is a further object that such process be volumetrically efficient in that it produces a high yield of rare earth metal per unit volume of reactor vessel space.

It is a further object of this invention to provide such a process that is particularly useful for producing neodymium and/or praseodymium metal alloys using a stirred molten calcium chloride-based reaction medium and calcium metal as the reductant.

It is a further object of this invention to provide such a reaction scheme whereby calcium fluoride byproduct is recycled as a reactant for forming neodymium fluoride from another neodymium (i.e., rare earth) starting material.

In accordance with a preferred embodiment of my invention, these and other objects are accomplished as follows.

BRIEF DESCRIPTION OF THE INVENTION

The practice of my invention will be illustrated by reference to the use of neodymium fluoride, $NdF_3$, but it will be appreciated that other rare earth element fluorides or mixtures of rare earth fluorides may be used as the starting material.

I prefer to start with a two-phase melt at a temperature of about 850° C. One phase is a salt phase consisting essentially of calcium chloride. Small amounts of other group I and group II chlorides may be present if desired, but they are not required. The second phase of the melt is a higher density metal alloy phase consisting essentially of rare earth metal and iron which is preferably of about the neodymium-iron composition (about 88 percent by weight neodymium and the balance iron). This phase is employed to absorb newly produced neodymium metal.

The two phase melt is stirred, and a charge of neodymium fluoride mixed with calcium metal is added to the stirred melt. Neodymium fluoride is miscible with the calcium chloride reaction medium as is some of the calcium metal. The reduction reaction is believed to proceed both as a solution reaction and as a heterogeneous reaction. The calcium chloride serves both to make possible the solution reaction and to provide fluidity for the two phase reaction. The heat of the reduction reaction between the calcium metal and neodymium fluoride is such as to help sustain the 850° C. temperature of the melt without preheating of the charged mixture.

Preferably, calcium is used in an amount in the range of about plus or minus 10 percent of the stoichiometric requirement of the rare earth fluoride. Where it is desired to assure the reduction of all of the rare earth fluoride added to the reactor, it is preferable to use a slight excess of calcium. However, where it is desired to minimize the calcium content at the completion of the reduction reaction, it is preferable to employ an amount of calcium that is slightly less than the stoichiometric amount.

When all of the calcium and neodymium fluoride have been charged, stirring is continued for a few minutes, usually no more than about 45 minutes, to complete the reduction reaction.

The stir rate is then reduced or stopped to allow the heavier metal phase containing the newly produced neodymium to separate from and below the salt layer, which now consists of about equal parts by weight of calcium chloride and calcium fluoride. Preferably, the initial charge of calcium chloride was such that the weight of the calcium chloride-calcium fluoride-salt byproduct is in the range of 1.5 to 2.0 times the theoretical weight of neodymium metal produced. Thus, surprisingly low salt-to-product ratio facilitates a rapid reduction reaction and the separation of a clean product in high speed while occupying minimal valuable reactor space.

An amount of the metal layer is withdrawn from the reactor equivalent to the amount of neodymium produced. This layer is a substantially pure mixture of iron and neodymium whose composition may be adjusted by the addition of iron, boron and other desired constituents to form suitable permanent magnet compositions.

The salt phase is removed from the reactor to the greatest extent possible without removing the residual metal pool. In a particularly efficient aspect of my invention, the resulting calcium chloride-calcium fluoride mixture may be atomized and solidified (or solidified and pulverized) and subsequently separated such as by aqueous dissolution of the calcium chloride. The calcium fluoride alone or mixed with calcium chloride may be used in the conversion of neodymium nitrate or chloride or other suitable starting compound to neodymium fluoride. Recovered calcium chloride may be dried and reused in the salt phase of the reactor. Any trace of residual neodymium fluoride can be recycled. Thus, it is seen that my process scheme offers utilization of the salts without discarding all byproducts to landfill or requiring other environmentally undesirable practices.

Other advantages of my invention will be appreciated from a detailed description thereof which follows in which reference will be had to the drawings.

DETAILED DESCRIPTION OF THE INVENTION

The methods of this invention are generally applicable to the efficient reduction of the fluoride salts of the rare earth elements. By rare earth elements I intend to include elements 57 through 71 of the Periodic Table of the Elements; that is, lanthanum through lutetium. However, it is contemplated that this practice will find particular application to the reduction of the trifluoride salts of praseodymium and neodymium. The examples which are set forth herein illustrate the reduction of neodymium fluoride ($NdF_3$), but it is understood that the same practices are applicable specifically to praseodymium fluoride and generally to the other rare earth fluorides, taking into account the difference in their respective atomic weights.

The rare earth elements occur together in minerals such as monazite and bastnaesite usually as mixed compounds including other metallic elements. These minerals can be beneficiated with respect to rare earth element content and the rare earths converted to suitable compounds for purposes of separating the mixed rare earths into one or more of their constituent elements. By such known practices, substantially pure neodymium, or neodymium containing a relatively small amount of praseodymium and lesser amounts of other rare earths, is available as neodymium fluoride. Such fluorides can be produced by reacting a suitable neodymium precursor compound with fluorine or ammonium fluoride. Such fluorides are suitable starting materials for the method of this invention. However, as will be seen, it is also suitable that neodymium fluoride be prepared by reaction of a hot, slightly acidic, aqueous solution of a water-soluble salt of neodymium, such as its nitrate or chloride, with suspended particles of water-insoluble calcium fluoride. Calcium fluoride reacts with neodymium compounds to form neodymium (or other rare earth) fluoride. This process is continued until all the calcium fluoride has reacted to form a water-soluble calcium salt. The neodymium fluoride precipitate is readily separated by decanting and/or filtration from the solution. It is dried, substantially pure and ready for use in the subject reduction process.

The subject reduction process involves the use of neodymium-iron alloys of approximately eutectic composition and of hot salt mixtures of calcium chloride and calcium fluoride at temperatures of the order of 850° C. These mixtures are corrosive and readily oxidizable, and the reaction is carried out in a suitable reaction vessel under a substantially nonoxidizing atmosphere. While the specific reduction apparatus is not a part of the subject invention, suitable apparatus for carrying out the reduction reaction part of my invention is illustrated in FIG. 1.

Figure 1:
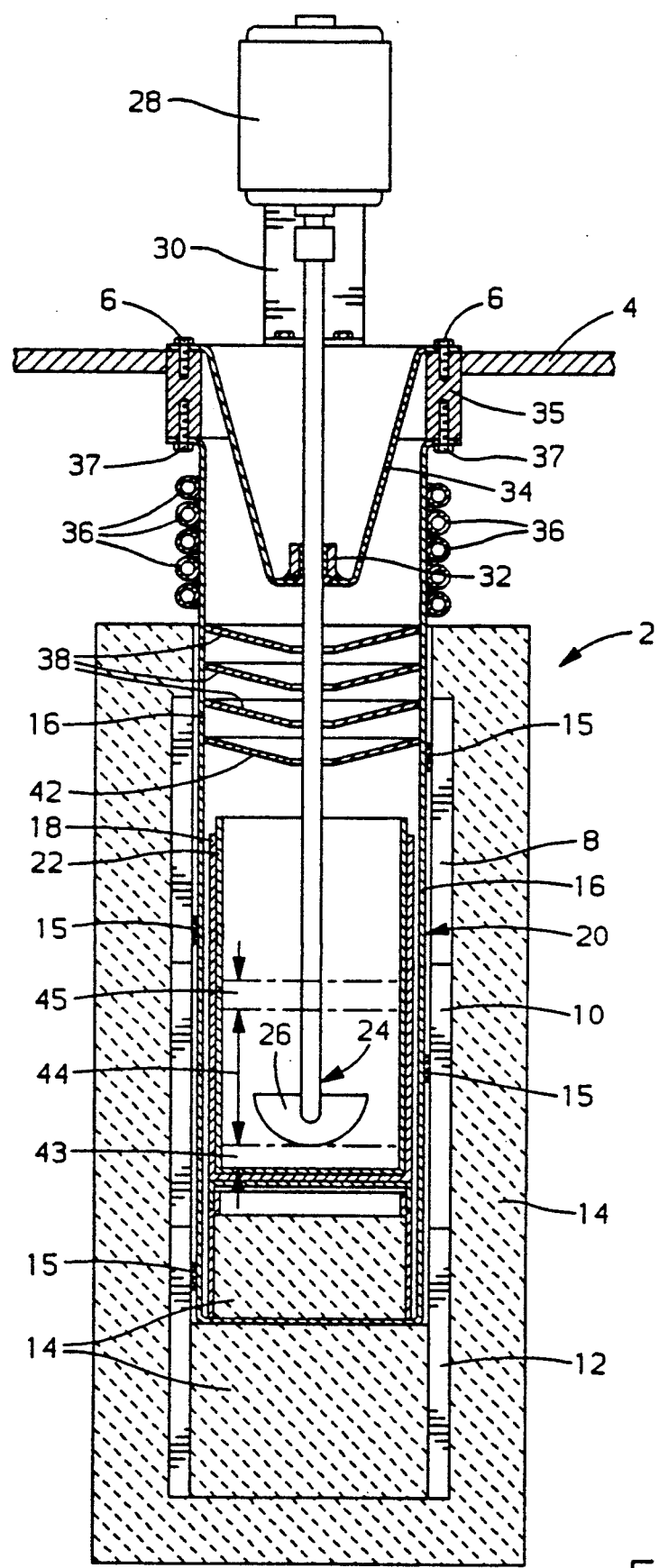
FIG. 1 is a schematic view in section of an apparatus suitable for carrying out the reduction reaction of the subject method.

FIG. 1 shows a furnace well 2 having an inside diameter of 12.7 cm and a depth of 54.6 cm mounted to the floor 4 of a dry box with bolts 6. A nonoxidizing or reducing atmosphere containing less than one part per million each $O_2$, $N_2$ and $H_2O$ is preferably maintained in the box during operation.

The furnace well 20 is heated by means of three axially aligned tubular, electric, clamshell heating elements 8, 10 and 12 having an inside diameter of 13.3 cm and a total length of 45.7 cm. The side and bottom of the furnace well 20 are surrounded with refractory insulation 14. Thermocouples 15 are mounted on the outer wall 16 of furnace well 20 at various locations along its length. One of the centrally located thermocouples is used in conjunction with a proportional band temperature controller (not shown) to automatically control center clamshell heater 10. The other three thermocouples are monitored with a digital temperature readout system, and top and bottom clamshell heaters 8 and 12 are manually controlled with transformers to maintain a fairly uniform temperature throughout the furnace.

Reduction reactions may be carried out in a reaction vessel 22 retained in stainless steel crucible 18. The vessel 22 has a 10.2 cm outer diameter, is 12.7 cm deep and 0.15 cm thick. It is retained in stainless steel furnace well 20. Reaction vessel 22 is preferably made of tantalum metal.

A tantalum stirrer 24 may be used to agitate the melt during the reduction process. The stirrer shown has a shaft 48.32 cm long and a welded blade 26. The stirrer is powered by a 100 W variable speed motor 28 capable of operating at speeds up to 700 revolutions per minute. The motor is mounted on a bracket 30 so that the depth of the stirrer blade in the reaction vessel can be adjusted. The shaft is journaled in a bushing 32 carried in an annular support bracket 34. The bracket is retained by collar 35 to which furnace well 20 is fastened by bolts 37. Chill water coils 36 are located near the top of well 20 to promote condensation and prevent escape of volatile reaction constituents. Cone-shaped stainless steel baffles 38 are used to condense any vapors.

When the constituents in the furnace are not adequately stirred, they separate into layers with the rare earth in the collection pool 43 on the bottom, the chloride salt bath 44 above and any unreacted reactive metal 45 above that.

EXAMPLE 1

A specific example will further illustrate the practice of my invention. In the practice of my method, a metal alloy pool of approximately the 88 w/o neodymium-12 w/o iron eutectic composition is employed to serve as an extraction or reservoir pool phase into which newly formed neodymium metal is absorbed. Thus, in this example, I first charged 274.59 grams of the eutectic alloy to my reactor. Twenty-six additional grams of iron were added to approximate the low melting alloy as the anticipated 200 grams of neodymium is formed in the course of the reduction reaction. This additional iron may be added at the beginning of the procedure or during the reduction reaction. Air had previously been evacuated from the dry box-reactor and a substantially oxygen-free argon atmosphere formed. Five hundred thirty-eight grams of calcium chloride were also added to the reactor and the contents heated to 850° C. so as to form a two-phase melt. A mixture of 279 grams of neodymium fluoride and 92 grams of calcium metal was added to the reactor and the reactor closed.

The temperature was quickly brought back to 850° C. while the contents were stirred at 450 RPM. The contents were stirred at 850° C. for 50 minutes. During this time, due to the high agitation of the reacting mix, there was intimate contact between the neodymium-iron reservoir pool phase and the reaction medium salt phase containing calcium chloride, dissolved neodymium fluoride and calcium fluoride formed as the byproduct of the reduction reaction between the calcium metal and the neodymium fluoride. Molten calcium metal is likely present as a third phase, and it is used in a slight chemically equivalent excess with respect to the neodymium fluoride.

After 50 minutes reaction time with high stirring, the stirring rate was reduced to about 100 RPM and stirring continued at this rate for 10 minutes. With this lower agitation, the more dense metal phase separated to a layer below the salt phase. This molten metal phase contains the collected neodymium product of the reduction reaction. The composition of the phase is still close to the Nd-Fe eutectic due to the Fe addition at the beginning of the reaction. The salt phase (CaCl$_2$—CaF$_2$) formed above the metal phase and unconsumed calcium metal formed as a third phase on top of the salt layer. The relatively slow stirring seems to facilitate the separation of the phases and minimizes emulsification of one material into another.

In a production-type reactor it would now be desired to separate the molten salt and metal layers by pumping them into separate vessels. In this situation, not all of the metal layer would be withdrawn from the reactor. Only the portion of the eutectic neodymium-iron composition corresponding to the amount of neodymium reduction product would be withdrawn. The remainder would be left in the reactor in a molten state for the start of the next batch reduction reaction.

Whereas in this small scale experiment we are not concerned with heat conservation, the contents of the reactor are simply allowed to solidify and cool to room temperature. The phases can be mechanically separated when in a solid state with a chisel or by washing away the salt phase with water. In this example, neodymium was recovered as eutectic alloy in a yield of 99.2 percent from the neodymium fluoride feedstock. The purity of the eutectic alloy was suitable for use in iron-neodymium-boron type permanent magnets.

Further in this example, the proportions of starting materials were chosen such that the weight of calcium chloride plus byproduct calcium fluoride was 3.5 times the weight of the theoretical yield of neodymium from the neodymium fluoride feedstock. In any given reactor/reaction scheme, it is desirable to reduce the amount of starting salt plus byproduct salt to a minimum consistent with the yield purity and separability of the neodymium product. It is highly desirable to have some salt reaction medium for purposes of temperature control, intimate mixing of the reactants, dissolution of byproduct salts and to facilitate separation of the neodymium product from the neodymium fluoride starting material. However, as will be shown, my practice of using neodymium fluoride and calcium chloride in the manner to be described will facilitate a substantial reduction of the salt requirement without sacrificing yield quality and recoverability of the neodymium.

ADDITIONAL EXAMPLES

Seven additional reduction experiments were carried out substantially as described above and in the same reactor with varying amounts and proportions of the same constituents. The amounts of the respective starting materials and products are summarized in the following table. In some instances the neodymium fluoride feedstock contained a small portion of calcium fluoride used in its preparation. The calcium fluoride content of the feedstock was taken into consideration in determining the amount of calcium chloride employed.

| Example No. | Alloy Pool | | Salt CaCl$_2$, g | Feedstock | | Reductant Ca, g | Nd Theory, g | Salt Ratio | Yield % |
|---|---|---|---|---|---|---|---|---|---|
| | Eutectic, g | Fe, g | | NdF$_3$, g | CaF$_2$, g | | | | |
| 1 | 274.59 | 26.0 | 538 | 279 | — | 92 | 200 | 3.5 | 99.2 |
| 2 | 274.72 | 26.0 | 520 | 279 | 18 | 92 | 198 | 3.5 | 99.6 |
| 3 | 360.18 | 52.0 | 450 | 558.6 | 29.4 | 188 | 400 | 2.0 | 100.0 |
| 4 | 350.69 | 52.0 | 475 | 558.6 | 42.0 | 184 | 400 | 2.1 | 100.0 |
| 5 | 380.06 | 55.0 | 445 | 600.0 | — | 202 | 430 | 1.85 | 100.0 |
| 6 | 410.76 | 59.0 | 395 | 637.6 | 33.4 | 215 | 457 | 1.75 | 100.0 |
| 7 | 480.58 | 69.0 | 367 | 743.6 | — | 250 | 533 | 1.5 | 100.0 |
| 8 | 480.49 | 69.0 | 328 | 743.6 | 39.4 | 250 | 533 | 1.5 | 99.2 |

It is seen that in examples 3 through 8 the "salt ratio", i.e., the weight of total salt (CaCl$_2$+CaF$_2$) compared to the theoretical weight of neodymium produced, was significantly reduced from the conservatively high quantities employed in examples 1 and 2. Despite a drastic reduction in the weight of calcium chloride used and a substantial increase in the weight of neodymium fluoride and calcium charged to the same reactor volume, the yield and quality of the neodymium-containing eutectic alloy did not decrease nor did the required reaction time increase. Thus, in accordance with the preferred practice of my method, the reaction mixture is composed such that the total of the starting salt, e.g., calcium chloride, plus byproduct salt, calcium fluoride, is no more than twice the rate of the theoretical yield of neodymium. In fact, as demonstrated in examples 3 through 8, this salt ratio may suitably lie in the range of 1.5 to 2.0 times the theoretical yield of rare earth metal.

I strongly prefer the use of calcium chloride as the salt phase reduction reaction medium in the practice of my method. However, it is to be understood that other group I and group II chloride salts may be employed with calcium chloride. Examples of such chlorides are potassium chloride, sodium chloride and barium chloride.

The suitable reaction temperatures for the conduct of this reduction reaction practice is in the range of 825° C. to 900° C. However, an average reaction temperature of the order of 850° C. is preferred because it facilitates a speedy reduction reaction, causes less chemical erosion of the reaction vessel, and it is a temperature at which the calcium chloride dissolves the calcium fluoride byproduct as well as the neodymium fluoride starting material. Furthermore, 850° C. appears to be a temperature that facilitates the separation of the metal reservoir phase from the salt phase at the completion of the reaction.

Figure 2:
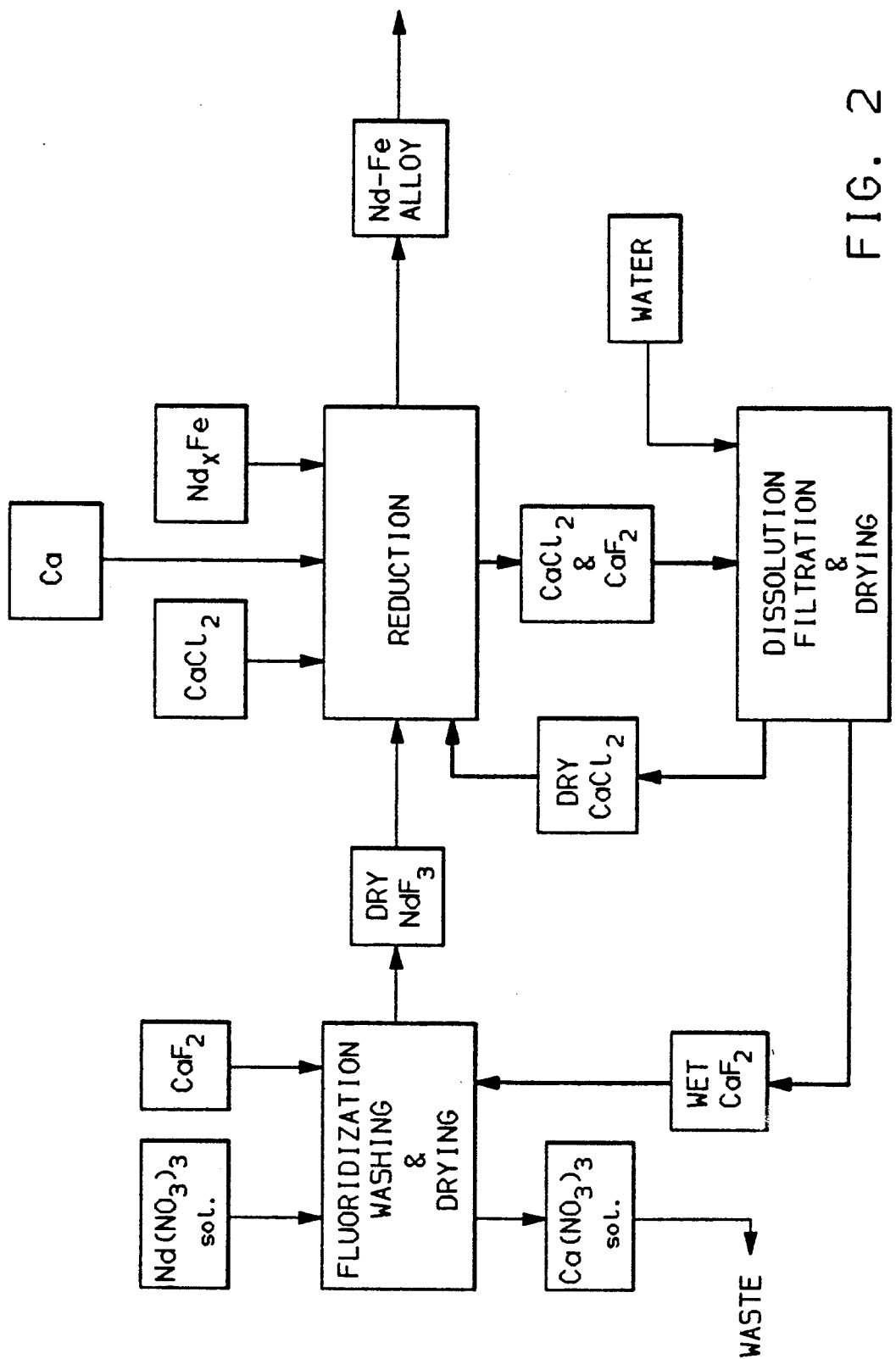
FIG. 2 is an idealized flow chart depicting both the chemical reduction and the recycling aspects of my invention.

FIG. 2 is a flow diagram that depicts both the reduction and the calcium salt recycle aspects of my method. FIG. 2 illustrates the practice of recycling both the calcium chloride and calcium fluoride byproduct salt mixture from the reduction reactor so as to minimize disposal problems and to utilize these materials.

FIG. 2 illustrates the addition of dry calcium chloride, dry neodymium fluoride, the neodymium-iron reservoir alloy, the calcium chloride salt reaction medium, and the calcium reductant to the reduction reactor. At the completion of the reduction reaction as described above, the neodymium-iron alloy in an amount corresponding to the newly reduced neodymium is withdrawn as a product from the reduction reactor and is suitable for use by the addition of alloying constituents in permanent magnet compositions. Also withdrawn from the reactor is the bulk of the calcium chloride-calcium fluoride salt layer.

Preferably, this molten salt layer is atomized or otherwise quenched into fine particles. In another suitable practice, the material is solidified in bulk and cooled and then pulverized into particles. In one recycle method, the solidified mixture is soaked in water which dissolves the calcium chloride constituent and leaves water-insoluble calcium fluoride and any residual rare earth fluoride. The insoluble calcium fluoride is filtered from the aqueous solution of calcium chloride. The wet calcium fluoride may then be reacted with an aqueous solution of a suitable water-soluble rare earth compound such as neodymium nitrate to form new neodymium fluoride as is depicted in FIG. 2.

In this way, the byproduct stream of calcium fluoride is utilized in preparing the neodymium fluoride starting material.

The solution of calcium chloride that is recovered from the byproduct stream may either be discarded or it may be concentrated by evaporation or other drying process to form dry calcium chloride for reuse as a reaction medium in the reduction reactor.

In summary, I provide a reduction process that produces high yield, high quality neodymium or other rare earth element metal in a minimum possible reactor volume. Further, I provide a practice that makes use of the reaction byproducts and permits recycling of the calcium chloride reaction medium.

While my invention has been described in terms of a few specific embodiments thereof, it will be appreciated that other forms could be readily adapted by one skilled in the art. Accordingly, the scope of my invention is to be limited only by the following claims.

The embodiments of the invention in which an exclusive property or privilege is claimed are defined as follows:

1. A method of producing rare earth metal from corresponding rare earth fluoride in high yield and low reactor volume, comprising
    preparing a melt under non-oxidizing atmosphere comprising a reaction medium salt phase initially consisting essentially of calcium chloride and a higher density metal alloy phase consisting essentially of rare earth metal and iron,
    adding rare earth fluoride to the melt,
    adding calcium metal to the melt in an amount sufficient to reduce a desired amount of the rare earth fluoride,
    stirring the melt and maintaining its temperature in the range of about 825° C. to 900° C. while the calcium reacts with rare earth fluoride to form rare earth metal and calcium fluoride, the weight of the initial charge of salt phase being determined such that its weight plus the weight of byproduct calcium fluoride is no more than about twice the theoretical yield of rare earth metal,
    abating the stirring rate to permit separation of the heavier metal phase, now containing the rare earth metal product, and the salt phase, and
    removing a desired amount of the product-containing metal phase from the salt phase.

2. A method of producing rare earth metal as recited in claim 1 where the rare earth fluoride added consists essentially of a rare earth fluoride selected from the group consisting of neodymium fluoride and praseodymium fluoride.

3. A method of producing rare earth metal as recited in claim 2 where calcium is added in an amount within the range bounded by plus or minus 10 percent of its stoichiometric amount with respect to the rare earth fluoride.

4. A method of producing rare earth metal as recited in claim 1 where the rare earth fluoride and calcium are added in increments until the desired amounts of each are added.

5. A method of producing rare earth metal as recited in claim 1 where byproduct calcium fluoride is used to react with an aqueous solution of rare earth compound to form a charge of rare earth fluoride for addition as feedstock to calcium chloride melt.

6. A method of producing rare earth metal as recited in claim 1 where the weight of the initial charge of salt phase is such that its weight plus the weight of byproduct calcium fluoride is in the range of about one and one-half to two times the theorectical yield of rare earth metal.

7. A method of producing rare earth metal comprising predominantly a rare earth selected from the group consisting of neodymium and praseodymium from corresponding rare earth fluoride in high yield and low reactor volume, comprising preparing a melt under non-oxidizing atmosphere comprising a reaction medium salt phase initially consisting essentially of calcium chloride and a higher density metal alloy phase consisting essentially of a said rare earth metal composition and iron, adding tot he melt rare earth fluoride corresponding in rare earth content substantially tot eh desired rare earth metal, adding calcium metal to the melt in an amount sufficient to reduce a desired amount of the rare earth fluoride, stirring the melt and maintaining its temperature in the range of about 825° C. to 900° C. while the calcium reacts with rare earth fluoride to form rare earth metal and calcium fluoride, the weight of the initial charge of salt phase being determined such that its weight plus the weight of byproduct calcium fluoride is in the range of about one and one-half to two times the theoretical yield of rare earth metal, abating the stirring rate to permit separation of the heavier metal phase, now containing the rare earth metal product, and the salt phase, and removing a desired amount of the product-containing metal phase from the salt phase.

8. A method of producing rare earth metal as recited in claim 7 where byproduct calcium fluoride is used to react with an aqueous solution of rare earth compound to form rare earth fluoride to be added as feedstock to the calcium chloride melt.

* * * * *